Dec. 16, 1952 — S. C. CARNEY — 2,622,114
FRACTIONAL CRYSTALLIZATION PROCESS AND APPARATUS
Filed Dec. 31, 1948 — 3 Sheets-Sheet 1

INVENTOR.
S. C. CARNEY
BY Hudson & Young
ATTORNEYS

Dec. 16, 1952 S. C. CARNEY 2,622,114
FRACTIONAL CRYSTALLIZATION PROCESS AND APPARATUS
Filed Dec. 31, 1948 3 Sheets-Sheet 2
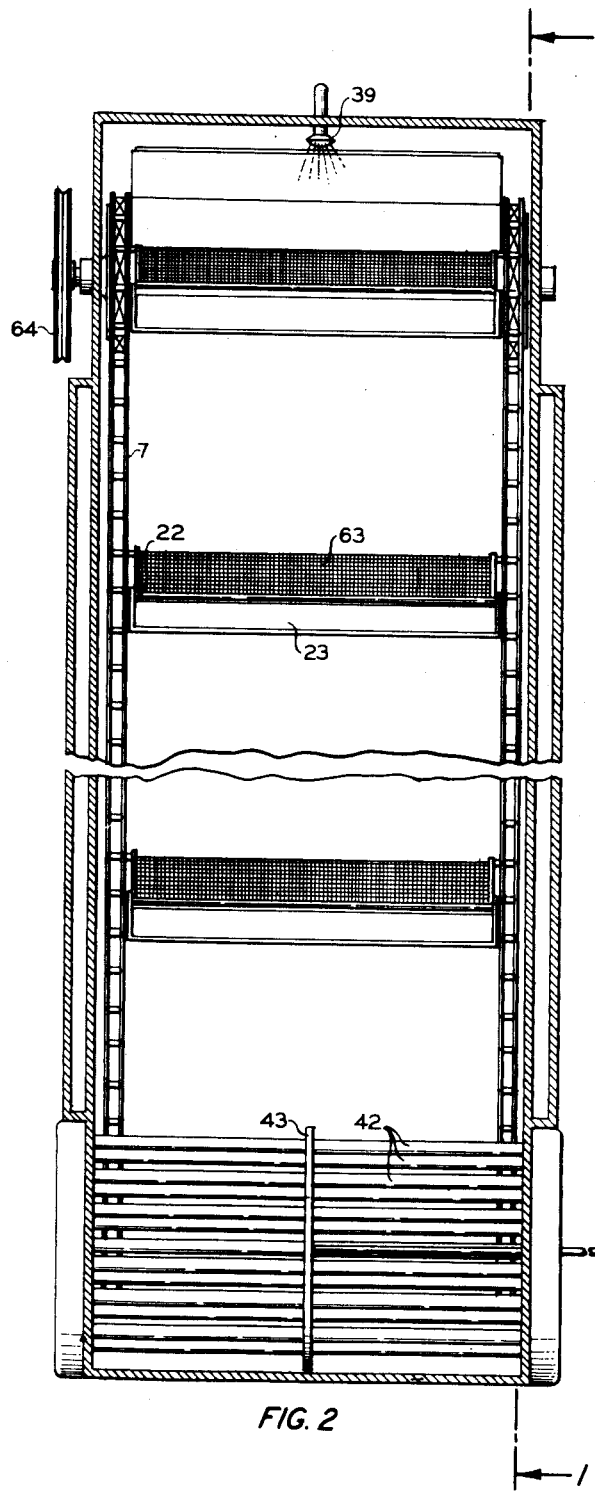
FIG. 2
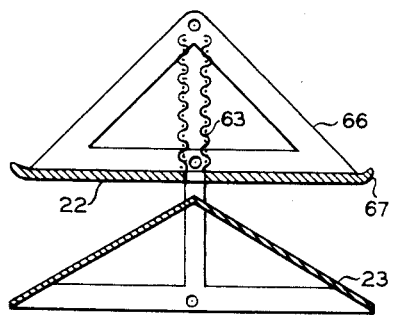
FIG. 3
INVENTOR.
S. C. CARNEY
BY Hudson & Young
ATTORNEYS Dec. 16, 1952     S. C. CARNEY     2,622,114

FRACTIONAL CRYSTALLIZATION PROCESS AND APPARATUS

Filed Dec. 31, 1948     3 Sheets-Sheet 3

LEGEND
L = LIQUID
S = SOLID

INVENTOR.
S. C. CARNEY
BY Hudson & Young
ATTORNEYS

Patented Dec. 16, 1952

2,622,114

UNITED STATES PATENT OFFICE 2,622,114

FRACTIONAL CRYSTALLIZATION PROCESS AND APPARATUS

Samuel C. Carney, Bartlesville, Okla., assignor to Phillips Petroleum Company, a corporation of Delaware Application December 31, 1948, Serial No. 68,461

25 Claims. (Cl. 260—707)

This invention relates to a method for separating mixtures of chemical compounds. In one specific aspect, it relates to a method for purifying organic compounds which are contaminated with similar compounds. In another specific aspect, it relates to a method for concentrating solutions by removal of the diluent as a solid. In still another specific aspect, it relates to an apparatus for separating mixtures of organic compounds by freezing one component and removing the frozen material.

In separating mixtures of chemical compounds, a widely used method is distillation. However, distillation procedures are not always applicable because some materials have such low vapor pressures at workable temperatures that separation by distillation is impossible. Other mixtures consist of components whose vapor pressures are so nearly the same at their boiling points that distillation cannot be used for separating them. In still other cases, the materials are decomposed at the temperatures to which they must be raised in separating them by distillation.

Another method used for separating mixtures of compounds is fractional crystallization. By this method, a body of liquid is cooled until it becomes saturated or supersaturated with one of the components, at which point the saturating component begins to crystallize. The solid material so formed is separated from the liquid and usually has to be melted and recrystallized one or more times before a pure component can be obtained. The yield by such a method is extremely low and the amount of energy expended in such a process is considerable. Such a method is usually carried out as a batch process and is rather inefficient.

If the mixture to be separated freezes as a solid solution, the number of recrystallizations necessary may be considerable and the yield very low.

I have discovered a method by which it is possible to separate mixtures of organic compounds in a continuous process. I have also invented an apparatus for carrying out my method of separation, which is particularly applicable to mixtures of organic compounds which melt over a range of temperatures and which are not decomposed by melting. I can separate such mixtures into a higher melting fraction and a lower melting fraction, the purity of which is determined by the specific system and the method of operating. In some cases, it is possible to obtain almost complete separation into two substantially pure fractions. The type of separations which can be obtained will be discussed later.

It is, therefore, an object of my invention to provide a method for separating mixtures of chemical compounds.

It is another object of my invention to provide a method for separating mixtures of organic compounds which melt over a range of temperatures into higher and lower melting fractions.

It is another object of my invention to provide a method for concentrating solutions by removal of a portion of the diluent.

It is another object of my invention to provide an apparatus for carrying out my method of separating organic compounds.

Numerous other objects and advantages of my invention will be apparent to those skilled in the art upon a study of the following drawings, disclosure and claims.

In the drawings:

Figure 2 is a cross sectional front view of my apparatus taken along the plane 2—2 of Figure 1.

Figure 3 is a cross sectional end view of the elevator trays used in my apparatus for moving solid material through the system.

Figure 1:
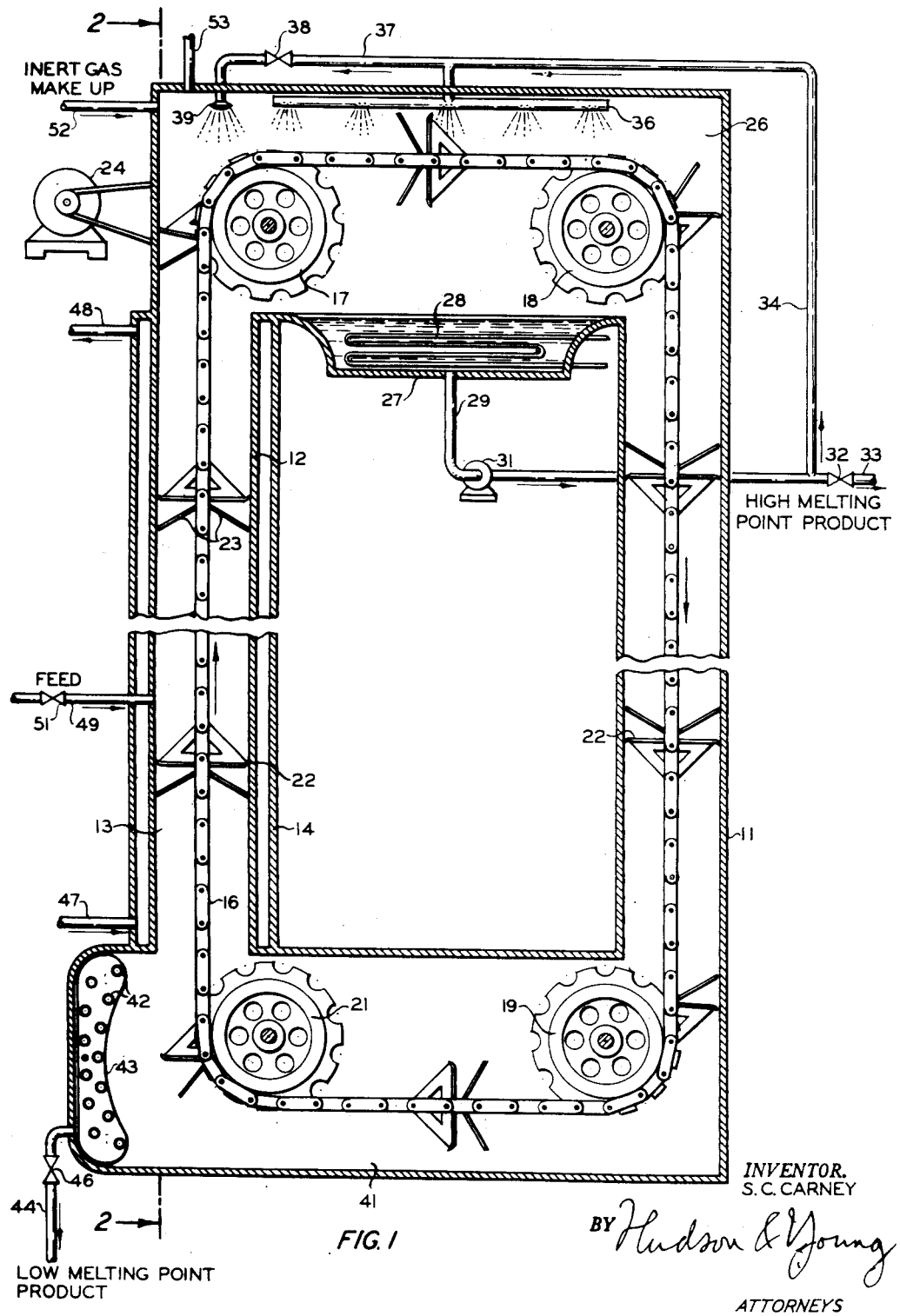
Figure 1 is a cross sectional side view of my apparatus showing the means for moving material through the system.

In Figure 1, outer shell 11 surrounds the entire apparatus and inner shell 12 forms an inner lining. Space 13, between the outer and inner shells, is the separation zone of my apparatus and is surrounded by a jacket 14. An endless chain 16, which is moved through the apparatus by means of sprocket wheels 17, 18, 19, and 21 carries, at spaced intervals, perforate trays 22. Attached to the chain below each tray is a baffle 23. Motor 24 is provided for driving the sprocket wheel 17. In the bottom of upper horizontal space 26 is a melt tank 27 having a heater coil 28 therein. Conduit 29 leads from said melt tank to pump 31 which may move the melted liquid through valve 32 and conduit 33, or a portion of the melted liquid may be run through line 34 to sprays 36 and a further portion is sent through line 37 and valve 38 to spray 39 for use as a reflux liquid. In the lower horizontal portion 41, is a bank of cooling coils 42 which is provided with a scraper 43. Outlet line 44 leads from a lower portion of the lower horizontal section through valve 46 for removing lower melting fraction from the system. Inlet line 47 and outlet line 48 are provided for circulating a heat exchange medium through the cooling jacket 14. Feed material is introduced into the system through feed line 49 controlled by valve 51. Line 52 is provided for introducing an inert make-up gas into the enclosed system and line 53 is provided for removing gases from the system.

In Figure 2 is shown more clearly the cooling coils 42 in the lower horizontal section with the scraper 43, said scraper being operated by means of crank 61 and pitman 62. Moving trays 22 are provided with a longitudinal slot down the middle for almost the entire length of said trays. This slot is protected by means of screens 63 which form a baffle along the entire length of the slot on each side to prevent solid material from falling from the tray. Sheave 64 is attached to a shaft which drives sprocket wheel 17 which, in turn, moves the elevator chains.

Figure 3 is a cross sectional view of one of the trays 22 showing baffle 23 and screens 63. The trays are supported by means of a bracket 66 at each end thereof. These trays are of such shape that there is only a small clearance between the trays and the inner walls of the separation zone 13. Each tray is provided with an upturned lip 67 along the edge for scraping material from the walls of the said zone.

Figure 4:
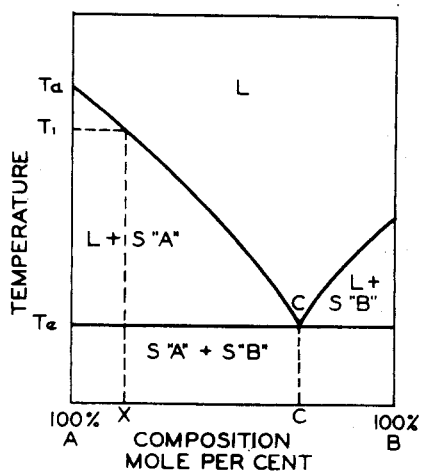
Figure 4 is a phase diagram for a binary mixture which forms a eutectic.
Figure 5:
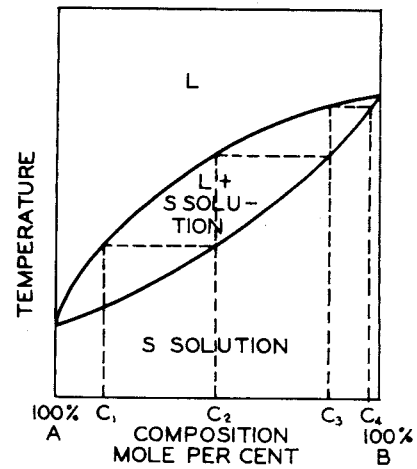
Figure 5 is a phase diagram for a binary mixture which freezes as a solid solution.
Figure 6:
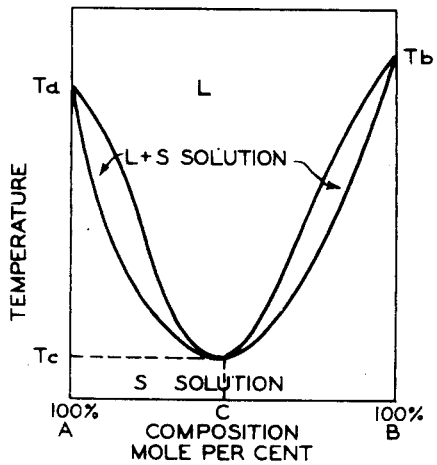
Figure 6 is a phase diagram for a binary mixture which forms solid solutions and which exhibits the minimum freezing point phenomenon.

Figures 4, 5 and 6 are ordinary phase diagrams for the systems previously described and as such are self-explanatory.

*Operation*

My invention is applicable to systems of organic compounds which melt over a range of temperatures. If the mixture melts at a single temperature, as in the case of eutectic mixtures, it is impossible to effect a separation by the method disclosed herein. However, I have disclosed in my copending application Serial No. 94,894, filed May 23, 1949, a method by which it is possible in effect to separate eutectic mixtures.

If the starting material melts over a range of temperatures, it can be separated by the method of this invention. Such a material is passed through line 49 into separation zone 13 where it falls onto a perforate tray 22. The temperature in said separation zone is maintained such that a substantial portion of the high melting component or fraction is solidified on entering the zone. This freezing may occur on contact with the cooled walls of the vessel, in which case it is scraped from the walls by the trays being raised through the separation zone or it may occur on the tray. The feed is introduced into the separation zone at such a point that the tray onto which it pours contains a mass of solid of slightly lower content with respect to the high melting component than the feed being introduced. When the liquid feed comes in contact with the solid on the tray, a portion of the feed is frozen and a portion of the solid on the tray having a lower melting point is melted. At the time the solid-liquid contact occurs, the liquid is richer with respect to the higher-melting component than the solid. At equilibrium, the solid must have the higher content of higher-melting component. In the drift towards equilibrium, a portion of the higher-melting component freezes and a portion of the lower-melting component of the solid melts. The freezing gives up a certain amount of heat, depending on the amount frozen and the heat of fusion for the particular component, which heat, in turn, is absorbed by the solid material on the tray and a portion of the solid melts. Since the material on the tray melts over a range of temperatures, the portion that melts is necessarily the lowest melting component, which may be either a pure component, or in the case of a solid solution, a mixture of the two components. In any case, the material that is melted has a lower melting point than the solid, since both phases exist in the system at the same temperature. The temperature at any point in the system is near enough to the melting point of the solid that the heat given up by the freezing of the high melting component must, when absorbed by the solid, melt a portion of said solid.

The trays have a central longitudinal slot which is protected by screen baffles 63 to prevent solid material from sliding off the tray. The liquid will pass through the screens onto baffles or shields 23 which deflect the liquid against the cooled walls of the vessel. This causes the liquid to run down the walls and as the liquid is cooled sufficiently that it is supersaturated with respect to one component, a portion of that component freezes out on the walls of the vessel and the remaining liquid travels downward. The liquid which does not freeze on the walls runs onto the next tray where it contacts solid material and the melting and freezing previously described occurs.

It is preferable to introduce the feed into the separation zone at a point such that the composition of the solid material on each tray as it reaches the feed inlet will be the same as the composition of the feed itself. As the tray is raised through the separation zone, the continuous melting of the lower melting material and freezing of higher melting material causes an increase in the content of higher melting material.

The temperature at the bottom of the separation zone is maintained slightly above the melting point of the low melting fraction which it is desired to remove from the bottom. The temperature at the top of the separation zone is maintained at a point slightly below the melting point of the higher melting fraction which it is desired to remove overhead as a solid. In this way, the lower melting fraction cannot flow into the bottom as a liquid unless it has a certain minimum content of higher melting components, and the higher melting fraction cannot leave the upper end of the separation zone as a solid unless it contains less than a certain maximum amount of the lower melting component or fraction. The temperature throughout the length of the separation zone is intermediate between the top and bottom temperatures.

The desired temperature may be maintained in the separation zone by means of a jacket surrounding said zone through which a proper heat exchange medium is circulated. It may be desirable to divide the jacket into compartments so that different heat exchange mediums may be used to produce the desired temperature gradient throughout the separation zone. On the other hand, it may be preferable to eliminate the jacket and surround the separation zone by a layer of insulation. Then, the temperature gradient throughout the zone will be controlled by the amount of heat added to the upper portion as sensible heat and heat of fusion of the reflux liquid and by the amount of heat withdrawn from the bottom of the zone as heat of fusion and sensible heat of the liquid withdrawn.

Whether the walls of the separation zone are jacketed or insulated, my invention still contemplates the use of a reflux liquid to be introduced into the top of the apparatus for contacting the solid material being raised through the separation zone. In practicing my invention, I prefer not to add any extraneous solvent but melt the high melting material removed overhead and return a portion of it to the system as a reflux liquid. In this way, the solid material will be contacted by a liquid of higher purity or higher content of high melting component than the solid being contacted. The reflux liquid introduces heat into the system as sensible heat and as heat of fusion, the amount of heat introduced as heat of fusion being dependent on the amount of reflux liquid and the heat of fusion for that liquid. The heat introduced as sensible heat is, of course, dependent upon the amount of reflux liquid added, the specific heat of such liquid and the difference between the temperature of the liquid and the freezing temperature. It is probably more desirable to introduce the reflux into the system at a temperature only slightly above the melting point of the reflux material itself so that a higher reflux ratio may be used without melting too much of the solid.

My separation zone acts somewhat as a fractionation column except that the upwardly rising material is a solid and must be mechanically raised through the system.

In order to remove the solid material from the trays, I have shown a series of sprays in the top of the upper horizontal portion which sprays are positioned to direct a stream of liquid onto the trays, which are at this point tilted in a sidewise position. The solid material may be melted from the trays or may be dislodged by the mechanical action of the sprays, but in any case the material from the trays and the spray liquid fall into the melt tank below where any solid is melted. A portion of this melted material is recycled through the sprays.

I prefer to maintain the bottom horizontal section full of the liquid lower-melting fraction and withdraw liquid only as it is formed in excess of the amount required for keeping this section filled. I prefer to maintain the temperature of the liquid in this bottom section only slightly above the melting point of the lower melting fraction filling this section. In this way, the trays are brought to the temperature maintained at the bottom of the separation zone. To maintain the desired temperature in the lower horizontal section of my apparatus, I have provided a bank of coils positioned in the end of said section just below the separation zone, and to prevent build up of frozen material on these coils, I have shown a scraper for removing such solid. Obviously other equivalent means for maintaining the desired temperature in this section may be substituted.

For most purposes, it is desirable to operate my apparatus at atmospheric pressure, and with the separation zone filled with an inert gas. Under certain conditions, it may be desirable to operate in an atmosphere of a particular gas or at a reduced or increased pressure. Provision is made for introducing gas into the system and for maintaining the desired pressure.

Purification or separation in a system such as I have described results from the plurality of liquid-solid contacts wherein the liquid is at substantially the same temperature as the solid being contacted and therefor must contain more of the higher melting fraction or component than said solid. Upon the partial change of phase from liquid to solid, the resulting solid contains a higher concentration of components of higher melting point than does the liquid with which it is in contact. The interchange of phase from liquid to solid and solid to liquid in a given tray is due to the heat content and composition of the two phases being contacted. The downflowing liquid phase has a relatively higher heat content and upon contact with the upwardly moving solid phase of lower heat content, a portion of the higher melting fraction solidifies giving up heat which is absorbed by the solid phase with the resultant melting of a portion of the lower melting fraction. It is necessary that the change of phase from solid to liquid and liquid to solid be repeated many times in my process. However, since the heat necessary for melting the solid is supplied principally as latent heat of fusion of the liquid reflux, it is not necessary that there be any substantial amount of heat added to or abstracted from the separation zone since heat is added to the zone by liquid reflux at the top and is removed by the cooling means at the bottom.

To maintain the desired temperature level in each section of the separation zone, I may use a jacket around said zone. This jacket may be divided into a plurality of compartments to permit the use of several refrigerants or cooling mediums or the same refrigerant at various pressures. The refrigerant liquid or vapor from one compartment may be used for cooling or heating in other compartments. When the solid is scraped off the side walls by the upwardly-moving trays, it is broken up and is able to contact the solid on the tray more intimately and to be contacted more intimately by the liquid.

In my process the solid at the top of the separation zone is contacted with a reflux liquid containing the highest concentration of the higher melting material. If a high-melting component is separated as a top product of high purity, the reflux liquid is likewise of high purity and the solid on the top tray is contacted with such a liquid which melts and/or washes out lower melting materials. The reflux liquid passing downwardly from tray to tray enriches the solid on each tray in respect to the higher melting material while simultaneously becoming enriched with the lower melting material until it reaches the bottom of the zone where it contains the maximum amount of lower melting material.

While it has not been shown in the drawings, my invention contemplates the use of stirring or agitating means for stirring the material on the trays and insuring more intimate contact between the liquid and solid. Such apparatus may take the form of a system of interconnected rabble arms or rakes permanently affixed to the tray and operated by a gear or eccentric at the center. This gear would mesh with a splined shaft extending the full length of the separation zone. The splines or enlarged portion of the shaft would be eliminated for a short distance at the bottom and top of the zone to permit engagement and disengagement of the trays.

While the apparatus is shown as being of a certain shape, it is to be understood that the shape of the separation zone is not critical. The size of the apparatus with respect to the amount of feed stock should be large enough so that the depth of solid on each of the trays does not become excessive and thereby prevent efficient contact with the liquid.

My invention is applicable to any mixture of compounds which melts over a range of temperatures and which is not decomposed by such melting. As explained before, the separation of a eutectic mixture cannot be obtained by practicing the method described herein. However, if one component is present in excess of the eutectic ratio, the excess of that saturating component may be removed as a solid overhead and the eutectic mixture removed as a liquid from the the bottom of the apparatus.

My invention will be more clearly understood from a discussion of the specific systems illustrated in Figures 4, 5 and 6.

Considering the system whose phase diagram is shown in Figure 4, the saturating component, either A or B, would be removed as a solid material overhead and a liquid having the composition represented by C would be the lower melting fraction removed from the bottom. If the starting material has a composition corresponding to X, as represented on the diagram, the temperature at the top of the separation zone would be maintained at TA and the temperature at which the saturating component, in this case A, would begin to freeze would be $T_1$. The temperature at the bottom of the separation zone would be maintained slightly above $T_e$, which is the eutectic temperature since it is desired that the lower melting material having a composition approaching the eutectic composition remain liquid throughout the system. Theoretically, a single crystallization would produce component A in a pure form. However, in actual practice, such a solid would contain a considerable amount of the mother liquid as occluded impurities and several liquid-solid contacts would be desirable. The reflux liquid in this case would be pure component A.

My method is effective in the separation of mixtures which form simple solid solutions without exhibiting maximum or minimum freezing points. Figure 5 is a phase diagram for such a system. For this system, the temperature at the top of the separation zone would be slightly below the melting point of pure component B and the temperature at the bottom would be slightly above the melting point of pure component A. Regardless of the composition of the feed, the material removed from the top would be component B and the material removed from the bottom would be component A if a sufficient number of liquid-solid contacts have been provided to secure substantially complete separation. If a lesser number of contacts have been provided both products may be concentrates of A and B, respectively. If a starting material of composition of $C_1$ is assumed, the solid which would be in equilibrium with such a liquid would have a composition corresponding to $C_2$ if the solid material, after the liquid had been drained off, were partially melted and equilibrium obtained between the solid and liquid, the resulting solid would have a composition corresponding to $C_3$. One more liquid-solid contact, under perfect equilibrium conditions, would result in a solid of composition $C_4$. In actual practice, it will usually be necessary to provide a greater number of contacts than indicated from such an equilibrium diagram because it is not possible to obtain complete equilibrium in each contact.

Figure 6 is a phase diagram for a mixture of components A and B where solid solutions are formed and there is a minimum melting point composition. In this case, if the feed liquid has a composition corresponding to a point between A and C, the temperature at the top of the column would be TA and the temperature at the bottom TC. In this case, substantially pure component A would be removed from the top and a solid solution corresponding to the composition C would be removed from the bottom. If the starting material had a composition between C and B, the temperature at the bottom of the column would still be maintained at TC but the temperature at the top of the separation zone would be $T_B$. Substantially pure component B would be removed from the top of the separation zone and solid solution of composition C would be removed from the bottom of the zone.

Figure 7:
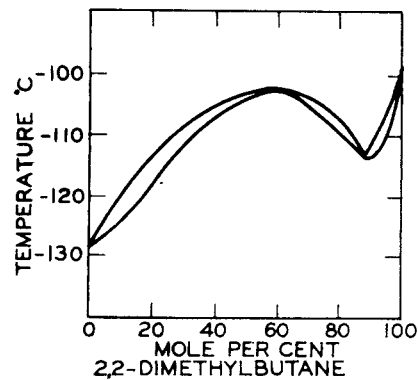
Figure 7 is a phase diagram for the system, 2-3-dimethylbutane-2-2-dimethylbutane.

From a study of the phase diagram for a specific mixture of organic compounds, it is possible to predict the type of separation possible to be obtained by using my process. As a specific example, the mixture comprising 70 per cent 2-3 dimethylbutane and 30 per cent 2-2 dimethylbutane is considered. The phase diagram for this system is shown in Figure 7 herein. In the following table are shown the specific conditions for making such a separation.

| | |
|---|---:|
| Feed rate _____lbs./hr__ | 16.9 |
| Overhead product rate _____lbs./hr__ | 10. |
| Bottom product rate _____lbs./hr__ | 6.9 |
| Reflux ratio liquid returned/overhead product _____ | 9/1 |
| Top temperature _____°F__ | −155 |
| Bottom temperature _____°F__ | −198 |
| Feed tray temperature _____°F__ | −164 |
| Composition of overhead product: | |
| 2,2-dimethylbutane _____per cent__ | 50 |
| 2-3 dimethylbutane _____do____ | 50 |
| Bottom product: | |
| 2-2 dimethylbutane _____do____ | 1 |
| 2-3 dimethylbutane _____do____ | 99 |

The equivalent of 4 theoretical equilibrium contacts was required above the feed tray and 9 below the feed tray.

While I have described a specific construction of my apparatus, it is to be understood that my invention is not to be limited thereby but obvious mechanical equivalents may be substituted therein without departing from the scope of the invention. The specific examples are to be considered as illustrative only and are given merely for the purpose of explaining the invention.

The invention may be used for the recovery, separation, and purification of a wide variety of organic materials including fatty acids, coal tar fractions, and petroleum hydrocarbons. For example, it may be employed for the separation of palmitic acid from palm oil; the recovery and purification of such compounds as quinaldine, or the separation of metacresol from paracresol, from coal tar fractions; or the separation and purification of petroleum hydrocarbons, such as separation of benzene from n-hexane, or of 2-3 dimethylbutane from 2-2 dimethylbutane. Likewise, the invention may be used for the recovery and separation of the products of various processes, such separation of nitro toluene isomers, recovery of styrene from the cracked products of alkyl benzene, or the recovery and purification of products as dicyclopentadiene which may be formed in the pyrolysis of petroleum fractions.

This method may also be used in making concentrates from water-containing liquids such as milk, wine, fruit and vegetable juices, and biological liquids such as penicillin broth. In these instances, the overhead product would be ice and the reflux liquid water. The bottom product would be a concentrate of the original liquid.

It is important in practicing my invention that a continuous gas phase be maintained throughout the length of the separation zone. This permits the solid material to be moved upward through the separation zone in separate portions and be subjected to a series of solid-liquid contacts with a liquid that is increasingly richer with respect to the fraction being removed overhead. The solid-liquid system strives to attain phase equilibrium but the continuous removal of the liquid formed in the solid-liquid contact and continuous addition of new liquid containing more of the higher melting point material than the liquid removed prevents the attainment of equilibrium. It is desirable in my process that the liquid formed in the solid-liquid contact be removed from contact with the solid as soon as it is formed and be replaced by fresh reflux from the tray above. Continuous washing with a stream of increasing purity or of increasing content of the higher-melting fraction will yield a product of higher purity than batch-washing with larger amounts of liquid. The optimum condition is that the amount of reflux or wash liquid in contact with the residual solid at any one time be never more than an infinitesimal amount. This condition cannot be attained in practice, but it can be closely approached in a system I have invented. It is not practicable to reach phase equilibrium in each contact but is preferred to use more contacts and reach partial equilibrium in each since the driving force is greatest when contact between the solid and liquid first occurs.

The optimum conditions for separation by crystallization cannot be attained or even closely approached in conventional crystallizers wherein there is a continuous liquid phase with which the solid is continuously in contact. Some degree of purification can be achieved but when equilibrium is reached between the solid and liquid with which it is in contact, no further change in the composition of the solid occurs unless the composition of the liquid is altered. Because of occluded mother liquor, not even the purity of a single theoretical stage is achieved by a single crystallization.

On the other hand, in my process, the higher-melting component is always present in the reflux liquid in an amount greater than can be present in such a liquid in equilibrium with the solid which is being contacted. This provides the driving force for the melting and freezing which occur.

A liquid-full column could not be used in my process. It would be impossible to maintain a composition gradient throughout the column in such a continuous mobile phase because of the agitation produced by the moving trays. In my process, the continuous phase is a gas, which does not have any effect on the solid and liquid compositions.

The specific examples given herein are for the purpose of explaining the disclosure and are not to be considered as unduly limiting the scope of my invention, which is defined by the following claims.

Having described my invention, I claim:

1. The method of separating a mixture which melts over a range of temperatures into a higher-melting fraction and a lower-melting fraction which comprises passing said mixture into a separation zone, solidifying at least a portion of said mixture and passing a plurality of separate vertically spaced-apart masses of resulting solid upward through said zone containing a discontinuous liquid phase, gravitating a reflux liquid through said separation zone as said discontinuous liquid phase richer in said higher-melting fraction than said solid, withdrawing higher-melting fraction as solid material from an upper portion of said zone and lower-melting fraction from a lower portion, adding heat to an upper portion of said zone and withdrawing heat from a lower portion of said zone, and introducing a liquid having a composition corresponding to that of the higher-melting fraction to an upper portion of said zone as a reflux.

2. The method of separating a mixture of organic compounds which melts over a range of temperatures into a higher-melting fraction and a lower-melting fraction which comprises crystallizing at least a portion of said mixture and passing resulting crystals upward through a separation zone containing a discontinuous liquid phase, gravitating a reflux liquid through said separation zone as said discontinuous liquid phase richer in said higher-melting fraction than said crystal, withdrawing the higher-melting fraction from an upper portion of said zone and the lower-melting fraction from a lower portion, adding heat to an upper portion of said zone and withdrawing heat from a lower portion of said zone, and spraying a liquid having a composition corresponding to that of the higher-melting fraction into an upper portion of said zone as a reflux.

3. The method of separating a mixture of organic compounds which melts over a range of temperatures into a higher-melting fraction and a lower-melting fraction which comprises solidifying at least a portion of said mixture and passing a plurality of separate vertically spaced-apart masses of resulting solid upward through a separation zone containing a discontinuous liquid phase, subjecting the upwardly moving solid to a plurality of solid-liquid contacts with a liquid which is increasingly richer with respect to the higher-melting fraction as said discontinuous phase richer in said higher melting fraction than said solid, withdrawing the higher-melting fraction from an upper portion of said zone and the lower-melting fraction from a lower portion, adding heat to an upper portion of said zone and withdrawing heat from a lower portion of said zone, and adding a liquid having a composition corresponding to that of the higher-melting fraction to an upper portion of said zone as a reflux.

4. The method of separating a mixture of organic compounds which melts over a range of temperatures into a higher-melting fraction and a lower-melting fraction which comprises solidifying at least a portion of said mixture and passing a plurality of separate vertically spaced-apart masses of resulting solid upward through a separation zone containing a discontinuous liquid phase, subjecting the upwardly moving solid to a plurality of solid-liquid contacts with a liquid which is increasingly richer upwardly with respect to the higher-melting fraction as said discontinuous phase richer in said higher melting fraction than said solid, withdrawing the higher-melting fraction from an upper portion of said zone and the lower-melting fraction from a lower portion, adding heat to an upper portion of said zone and withdrawing heat from a lower portion of said zone, and melting at least a portion of said higher-melting fraction and returning it to an upper portion of said zone as a reflux liquid in discontinuous phase.

5. The method of separating a mixture of organic compounds which melts over a range of temperatures into a higher-melting fraction and a lower-melting fraction which comprises solidifying at least a portion of said mixture and passing a plurality of separate vertically spaced-apart masses of resulting solid upward through a separation zone containing a discontinuous liquid phase, subjecting the upwardly moving solid to a plurality of solid-liquid contacts with a liquid which is increasingly richer with respect to the higher-melting fraction as said discontinuous phase richer in said higher melting fraction than said solid, withdrawing the higher-melting fraction from an upper portion of said zone and the lower-melting fraction from a lower portion, adding heat to an upper portion of said zone and withdrawing heat from a lower portion of said zone, melting at least a portion of said higher-melting fraction and returning it to an upper portion of said zone as a reflux liquid in discontinuous phase, and maintaining a continuous gas phase in the separation zone.

6. The method of separating a mixture of organic compounds which melts over a range of temperatures into a higher-melting fraction and a lower-melting fraction which comprises solidifying at least a portion of said mixture and passing a plurality of separate vertically spaced-apart masses of resulting solid upward through a separation zone containing a discontinuous liquid phase, subjecting the upwardly moving solid to a plurality of solid-liquid contacts with a liquid which is increasingly richer with respect to the higher-melting fraction as said discontinuous phase richer in said higher melting fraction than said solid, withdrawing the higher-melting fraction from an upper portion of said zone and the lower-melting fraction from a lower portion, adding heat to an upper portion of said zone, and maintaining indirect heat exchange between a heat exchange fluid and the mixture in said zone intermediate the ends thereof.

7. The method of separating a mixture of organic compounds which melt over a range of temperatures into higher-melting and lower-melting fractions which comprises moving the solidified mixture in a plurality of separate vertically spaced-apart masses upward through a vertically disposed separation zone in countercurrent contact with a downward-flowing stream of reflux liquid in discontinuous phase; removing the higher-melting fraction as a solid overhead product, and the lower-melting fraction as a liquid bottoms product; returning a portion of said higher-melting component to an upper portion of said separation zone as a liquid reflux; maintaining a temperature differential between the bottom and top of said separation zone such that material containing more than a predetermined amount of the higher-melting component will remain solid at the top of said separation zone and material containing less than a predetermined amount of higher-melting component will remain liquid at the bottom of said separation zone.

8. The method for separating a portion of the saturating component from a binary organic mixture which comprises passing said mixture into a separation zone containing a discontinuous liquid phase; solidifying a portion of the saturating component; moving a plurality of separate vertically spaced-apart masses of resulting solidified portion upwardly through said separation zone; subjecting the upwardly moving solidified material to a plurality of solid-liquid contacts with a liquid as said discontinuous liquid phase which is increasingly richer with respect to the saturating component; removing a portion of the saturating component as a solid overhead and removing the remainder of the mixture as a liquid below; adding heat to an upper portion of said separation zone and abstracting heat from a lower portion; and introducing to an upper portion of said zone a reflux liquid having a composition corresponding to the composition of the solid being removed overhead.

9. In a crystallization apparatus of the type described, means for effecting a plurality of contacts between a solid organic material and a reflux liquid of higher purity with respect to the higher-melting component which comprises a vertically disposed chamber open at the top and bottom ends, a conveyor having a plurality of perforate trays of such shape as to fit closely into said vertical chamber during their passage therethrough, at least one liquid deflector intermediate each adjacent pair of said perforate trays and directed toward the walls of said vertical chamber for deflecting the liquid draining through the perforations of each tray against the walls of said chamber, means for moving said trays upwardly through said chamber, means for controlling the temperature within said chamber, an inlet for introducing a reflux liquid into an upper portion of said chamber, and means for maintaining a continuous, inert gas phase in said apparatus.

10. The separation apparatus of the type described comprising, in combination, an upper and a lower chamber in communication with each other by means of a pair of opposed vertical chambers comprising a separation zone and a conveyor return shaft, a conveyor adapted to move solid material in separate portions upward through said separation zone, said conveyor comprising perforate trays and means for moving said trays upward through said separation zone, means for controlling the temperature in said separation zone, sprays in an upper portion of said upper chamber disposed along the horizontal path of the conveyor adapted to direct a stream of liquid onto the conveyor and thereby remove the solid material, a melting tank under said horizontal section for receiving and melting the material removed from said conveyor, conduit means connecting a lower portion of said melting tank with said sprays, conduit means for transferring the molten material to an upper portion of said vertical separation zone, conduit means for removing the molten material from the system, a feed conduit for introducing material into said separation zone, a conduit for removing liquid from said lower chamber and means for controlling the pressure in said apparatus.

11. The method of removing a portion of the water from an aqueous solution with minimum removal of the solute which comprises passing said solution into a separation zone containing a discontinuous liquid phase; freezing a portion of said water; moving a plurality of separate vertically spaced-apart masses of resulting frozen water upward through said separation zone; gravitating water through said zone as a reflux liquid as said discontinuous liquid phase; subjecting the upwardly-moving solid to a plurality of solid-liquid contacts with said reflux liquid;

removing the frozen water from an upper portion of said zone; removing the concentrated solution from a lower portion of said zone; and abstracting sufficient heat from said separation zone to freeze an amount of liquid greater than the amount of reflux liquid added.

12. The method of concentrating a liquid disperse system with respect to the dispersoid which comprises passing said disperse system into a separation zone containing a discontinuous liquid phase; freezing a portion of the dispersion medium; passing a plurality of separate vertically spaced-apart masses of resulting frozen solid upward through said separation zone in countercurrent contact with a gravitating reflux liquid which is increasingly richer with respect to the dispersion medium as said discontinuous liquid phase; introducing additional amounts of the dispersion medium into an upper portion of said zone as a reflux; removing the solidified dispersion medium as an overhead product; removing the concentrated disperse system as a liquid from a lower portion of said zone; abstracting sufficient heat from the sytsem to freeze an amount of the dispersion medium greater than the amount added as reflux.

13. The method of claim 12 wherein the dispersion medium is water.

14. The method of separating a mixture which melts over a range of temperatures into a higher-melting fraction and a lower-melting fraction which comprises passing said mixture into a separation zone containing a discontinuous liquid phase, solidifying at least a portion of said mixture and passing a plurality of separate vertically spaced-apart masses of resulting solid upward through said zone, passing a reflux liquid downward through said separation zone in discontinuous phase, withdrawing the higher-melting fraction from an upper portion of said zone and the lower-melting fraction from a lower portion, adding heat to an upper portion of said zone and withdrawning heat from a lower portion of said zone, maintaining a continuous inert gas phase in the separation zone, and adding a liquid having a composition corresponding to that of the higher-melting fraction to an upper portion of said zone as a reflux.

15. A method of separating a solid solution of organic compounds having a higher-melting component and a low-melting component which comprises moving a plurality of separate vertically spaced-apart masses of said solid solution upward through a separation zone in countercurrent contact with a reflux liquid in discontinuous phase which is richer with respect to the higher-melting component than said solid solution; adding heat to an upper portion of said separation zone and withdrawing heat from a lower portion of said zone; removing a fraction rich in the higher-melting component as a solid overhead product and a fraction rich in the low-melting component as a liquid bottom product; maintaining a continuous gas phase in the separation zone; melting a portion of said higher-melting fraction and returning it to the top of said zone as a reflux liquid.

16. The method for separating a portion of the saturating component from a binary organic mixture which comprises passing said mixture into a separation zone containing a discontinuous phase; solidifying a portion of the saturating component; moving a plurality of separate vertically spaced-apart masses of resulting solidified portion upwardly through said separation zone; subjecting the upwardly moving solidified material to a plurality of solid-liquid contacts with a liquid which is increasingly richer with respect to the saturating component as said discontinuous liquid phase; removing a portion of the saturating component as a solid overhead and removing the remainder of the mixture as a liquid below; adding heat to an upper portion of said separation zone and abstracting heat from a lower portion; adding to an upper portion of said zone a reflux liquid in discontinuous phase having a composition corresponding to the composition of the solid being removed overhead; and maintaining a continuous inert gas phase in the separation zone.

17. The method of fractionating a solid material having a higher-melting fraction and a low-melting fraction which comprises passing said solid material in a series of separate spaced-apart masses through a fractionation zone, contacting the masses of solid material successively with a reflux consisting of liquid more enriched with respect to higher-melting fraction than said solid material, said reflux liquid being maintained in discontinuous phase.

18. The method of fractionating a solid material having a higher-melting fraction and a low-melting fraction which comprises passing said solid material in a series of separate spaced-apart masses through a fractionation zone, contacting the masses of solid material successively with a reflux consisting of substantially pure liquid higher-melting component, said reflux liquid being maintained in discontinuous phase.

19. The method of separating a liquid mixture of organic compounds having a higher-melting component and a low-melting component and which forms a solid solution upon solidification which comprises solidifying at least a portion of said liquid mixture and contacting resulting solid material in upwardly moving vertically spaced-apart separate masses with a discontinuous liquid phase more enriched with respect to the higher-melting fraction than said solid material, said liquid phase first contacting the uppermost mass and gravitating through successively lower masses.

20. The method of separating a liquid mixture of organic compounds having a higher-melting component and a low-melting component and which forms a solid solution upon solidification which comprises solidifying at least a portion of said liquid mixture and contacting resulting solid material in upwardly moving vertically spaced-apart separate masses with a substantially pure higher-melting fraction in discontinuous liquid phase, said liquid phase first contacting the uppermost mass and gravitating through successively lower masses.

21. A method of fractionating a solid having a higher-melting fraction and a lower-melting fraction which comprises passing separate vertically spaced-apart masses of said solid upwardly through a walled separation zone; maintaining a discontinuous liquid reflux phase in said zone by spraying liquid higher-melting fraction over the uppermost of said masses so as to remove therefrom lower-melting fraction and increase the concentration of higher-melting fraction therein; draining residual liquid containing lower-melting fraction and gravitating same toward the next lower of said masses; deflecting said residual liquid against the wall of said zone and maintaining temperature conditions in said zone so as to freeze out at least a portion of the higher-melting fraction of said residual liquid on said wall; scraping the frozen portion and residual liquid off said wall onto said next lower of said masses; passing remaining liquid down the wall of said zone and withdrawing same from the bottom thereof as a fraction rich in said lower-melting fraction; and recovering solid rich in said higher-melting fraction from the upper section of said zone.

22. The process of claim 21 in which liquid scraped from said wall is passed laterally across said masses in contact therewith to the central portions thereof and then downwardly through same.

23. The apparatus of claim 9 in which said trays have up-turned lips engaging the walls of the column so as to scrape any liquid and solid therefrom, each of said trays being perforate in the center section thereof and imperforate between said center section and said lips.

24. Apparatus of claim 10 in which the edges of said perforate trays are adapted to engage the walls of said separation chamber and scrape crystals therefrom onto said trays.

25. The method of purifying a solid organic material containing an impurity of lower melting point than said solid material, which comprises passing said solid material through a purification zone, contacting said solid material therein at gradually increasing temperature with a liquid reflux richer in said solid material than the material itself at the time of contact so as to purify said solid material, withdrawing purified solid material from said purification zone, melting the withdrawn purified solid material in a separate melting zone outside of said purification zone, and returning a portion of the melt to said purification zone as reflux.

SAMUEL C. CARNEY.

REFERENCES CITED

The following references are of record in the file of this patent:

UNITED STATES PATENTS

| Number | Name | Date |
|---|---|---|
| 919,616 | Monti | Apr. 27, 1909 |
| 1,576,137 | Johnson | Mar. 9, 1926 |
| 1,738,275 | Baker | Dec. 3, 1929 |
| 2,225,799 | Robinson | Dec. 24, 1940 |
| 2,402,158 | Glowacki | June 18, 1946 |
| 2,425,335 | Messing et al. | Aug. 12, 1947 |
| 2,427,042 | Bowman | Sept. 9, 1947 |